(12) United States Patent
Wan et al.

(10) Patent No.: US 8,650,027 B2
(45) Date of Patent: Feb. 11, 2014

(54) ELECTROLARYNGEAL SPEECH RECONSTRUCTION METHOD AND SYSTEM THEREOF

(75) Inventors: Mingxi Wan, Xi'an (CN); Liang Wu, Xi'an (CN); Supin Wang, Xi'an (CN); Zhifeng Niu, Xi'an (CN); Congying Wan, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 13/603,226

(22) Filed: Sep. 4, 2012

(65) Prior Publication Data

US 2013/0035940 A1 Feb. 7, 2013

Related U.S. Application Data

(63) Continuation of application No. PCT/CN2010/001022, filed on Jul. 9, 2010.

(51) Int. Cl.
| | | |
|---|---|---|
| *G10L 11/00* | (2006.01) | |
| *G10L 17/00* | (2013.01) | |
| *G10L 13/00* | (2006.01) | |
| *G10L 21/06* | (2013.01) | |

(52) U.S. Cl.
USPC ............ 704/200; 704/250; 704/258; 704/271

(58) Field of Classification Search
USPC .......... 704/200, 250, 258–271; 381/70; 623/9
See application file for complete search history.

(56) References Cited

U.S. PATENT DOCUMENTS

| | | | | |
|---|---|---|---|---|
| 4,109,103 | A | * | 8/1978 | Zagoruiko et al. ............ 704/261 |
| 4,292,472 | A | * | 9/1981 | Lennox ............................ 381/70 |
| 4,547,894 | A | * | 10/1985 | Benson et al. .................. 381/70 |
| 4,550,427 | A | * | 10/1985 | Katz et al. ...................... 381/70 |
| 4,571,739 | A | * | 2/1986 | Resnick .......................... 381/70 |
| 4,672,673 | A | * | 6/1987 | Katz et al. ...................... 381/70 |

(Continued)

FOREIGN PATENT DOCUMENTS

| | | |
|---|---|---|
| CN | 1776809 A | 5/2006 |
| CN | 101030384 A | 9/2007 |
| CN | 101474104 A | 7/2009 |
| WO | WO2010/004397 A1 | 1/2010 |

OTHER PUBLICATIONS

Titze, I. R. (2008). Nonlinear source-filter coupling in phonation: Theory. The Journal of the Acoustical Society of America, 123, 2733.*

(Continued)

*Primary Examiner* — Edgar Guerra-Erazo
(74) *Attorney, Agent, or Firm* — J.C. Patents

(57) ABSTRACT

The invention provides an electrolaryngeal speech reconstruction method and a system thereof. Firstly, model parameters are extracted from the collected speech as a parameter library, then facial images of a speaker are acquired and then transmitted to an image analyzing and processing module to obtain the voice onset and offset times and the vowel classes, then a waveform of a voice source is synthesized by a voice source synthesis module, finally, the waveform of the above voice source is output by an electrolarynx vibration output module, wherein the voice source synthesis module firstly sets the model parameters of a glottal voice source so as to synthesize the waveform of the glottal voice source, and then a waveguide model is used to simulate sound transmission in a vocal tract and select shape parameters of the vocal tract according to the vowel classes.

9 Claims, 4 Drawing Sheets

(56) References Cited

U.S. PATENT DOCUMENTS

| | | | | |
|---|---|---|---|---|
| 4,821,326 | A * | 4/1989 | MacLeod | 704/261 |
| 5,121,434 | A * | 6/1992 | Mrayati et al. | 704/261 |
| 5,326,349 | A * | 7/1994 | Baraff | 623/9 |
| 6,006,175 | A * | 12/1999 | Holzrichter | 704/208 |
| 6,408,273 | B1 * | 6/2002 | Quagliaro et al. | 704/271 |
| 6,487,531 | B1 * | 11/2002 | Tosaya et al. | 704/246 |
| 6,856,952 | B2 * | 2/2005 | Clapper | 704/200 |
| 6,999,924 | B2 * | 2/2006 | Burnett et al. | 704/233 |
| 7,082,393 | B2 * | 7/2006 | Lahr | 704/233 |
| 7,082,395 | B2 * | 7/2006 | Tosaya et al. | 704/246 |
| 7,212,639 | B1 * | 5/2007 | Houston | 381/70 |
| 7,676,372 | B1 * | 3/2010 | Oba | 704/271 |
| 2005/0281412 | A1 * | 12/2005 | Hillman et al. | 381/70 |
| 2011/0051944 | A1 * | 3/2011 | Kirkpatrick | 381/70 |
| 2011/0190881 | A1 * | 8/2011 | Russell et al. | 623/9 |

OTHER PUBLICATIONS

Russell, M.J.; Rubin, D.M.; Marwala, T.; Wigdorowitz, B., "A voting and predictive Neural Network system for use in a new artificial Larynx," Biomedical and Pharmaceutical Engineering, 2009. ICBPE '09. International Conference on , vol., No., pp. 1,4, Dec. 2-4, 2009.*
International Search Report of International Application No. PCT/CN2010/001022, dated Apr. 7, 2011.

* cited by examiner

ELECTROLARYNGEAL SPEECH RECONSTRUCTION METHOD AND SYSTEM THEREOF

CROSS-REFERENCE TO RELATED APPLICATIONS

This application is a continuation of International Application No. PCT/CN2010/001022, filed on Jul. 9, 2010. The contents of the above identified application are incorporated herein by reference in its entirety.

FIELD OF THE TECHNOLOGY

The invention belongs to the field of pathological speech rehabilitation and particularly relates to an electrolaryngeal speech reconstruction method and a system thereof.

BACKGROUND OF THE INVENTION

Speech or language is a main method used by people to exchange and express their feelings, however, according to the statistics, thousands of people all over the world temporarily or permanently have lost their sounding capability due to various laryngeal surgical operations. In consideration of this situation, various speech recovery technologies emerge as the times require. Among the various speech recovery technologies, Esophageal speech, Tracheoesophageal speech and artificial Electrolaryngeal speech are the most common ones, and an artificial electrolarynx is widely applied because of its simplicity in use, wide scope of application and long sounding time.

In a Chinese patent application No. 200910020897.3, the invention discloses an automatically regulated pharyngeal electrolarynx speech communication method which removes other noises to improve the quality of the reconstructed speech. The working principle of an electrolarynx is as follows: providing a lost voice source, transmitting the vibration by a transducer into a vocal tract to conduct speech modulation, and finally, generating the speech by lip end radiation. Thus, it can be seen that providing the lost voice source is the fundamental task of the electrolarynx, however, the voice sources provided by the electrolarynx in the market are mostly square waves or pulse signals, though an improved linear transducer can output a glottal voice source, the voice source and the glottal voice source cannot meet the requirements of the lost voice source in the practical use process. For either an external neck type electrolarynx or an oral type electrolarynx, the position, from which the vibration is transmitted to the vocal tract, is not the glottis; for the different operation situations of different patients, not only the loss of vocal cord but also the loss of partial vocal tract need to be compensated in the voice source of the electrolarynx; therefore, it is quite necessary to improve the electrolaryngeal speech quality from the essence of the electrolarynx.

In consideration of the above problems, it is indeed necessary to provide an electrolaryngeal speech reconstruction method and a system thereof to solve the above technical problems.

SUMMARY

To solve the technical problems, the invention provides an electrolaryngeal speech reconstruction method and a system thereof. The speech reconstructed by the method not only compensates the acoustic features of a vocal tract, but also keeps the individualized characteristics of the user, and is much closer to the characteristics of voice of the user himself, in addition, the quality of the speech is better.

In order to fulfill the purposes, embodiments of the invention provides an electrolaryngeal speech reconstruction method. Firstly, model parameters are extracted from the collected speech as a parameter library, then facial images of a speaker are collected and transmitted to an image analyzing and processing module, then voice onset and offset times as well as vowel classes are obtained after the analysis and the processing of the image analyzing and processing module, then the voice onset and offset times as well as the vowel classes are used to control a voice source synthesis module to synthesize a waveform of a voice source, finally, an electrolarynx vibration output module outputs the waveform of the voice source; the electrolarynx vibration output module comprises a driving circuit and an electrolarynx vibrator; and the synthesis steps of the voice source synthesis module are as follows:

1) Synthesize the waveform of a glottal voice source, that is, select the model parameters of the glottal voice source from the parameter library according to the individualized sounding features of the speaker, wherein the voice onset and offset times control the starting and the stopping of the synthesis of the voice source, and the synthesis of the glottal voice source adopts an LF model with the specific math expression as follows:

$$\begin{cases} u'_g(t) = E_0 e^{\alpha t} \sin(\omega_g t) & (0 \le t \le t_e) \\ u'_g(t) = -\left(\dfrac{E_e}{\varepsilon t_a}\right)[e^{-\varepsilon(t-t_e)} - e^{-\varepsilon(t_c t_e)}] & (t_e \le t \le t_c) \end{cases}$$

In the above expression, Ee is the amplitude parameter, $t_p$, $t_e$, $t_a$ and $t_c$ are all time parameters which respectively represent the maximum peak time, the maximum negative peak time, the time constant of exponential return phase and the pith period, and the rest parameters can be obtained by the above five parameters with reference to the following formulas:

$$\begin{cases} \varepsilon t_a = 1 - e^{-\varepsilon(t_c - t_e)} \\ \omega_g = \dfrac{\pi}{t_p} \\ U_e = E_0[e^{\alpha t_e}(\alpha\sin\omega_g t_e - \omega_g\cos\omega_g t_e) + \omega_g]/(\alpha^2 + \omega_g^2) \\ E_e = -E_0 e^{\alpha t_e} \sin\omega_g t_e \\ U_e = \dfrac{E_e t_a}{2} K_a \\ K_a = \begin{cases} 2.0 & R_a < 0.1 \\ 2 - 2.34 R_a^2 + 1.34 R_a^4 & 0.1 \le R_a \le 0.5 \\ 2.16 - 1.32 R_a + 0.64(R_a - 0.5)^2 & R_a > 0.5 \end{cases} \\ R_a = \dfrac{t_a}{t_c - t_e} \end{cases}$$

2) Select shape parameters of the vocal tract according to the vowel classes, simulate sound transmission in the vocal tract by using a waveguide model, and calculate the waveform of the voice source according the following formulas:

$$\begin{cases} u_{i+1}^+ = (1 - r_i)u_i^+ - r_i u_{i+1}^- = u_i^+ - r_i(u_i^+ + u_{i+1}^-) \\ u_i^- = (1 + r_i)u_{i+1}^- + r_i u_i^+ = u_{i+1}^- + r_i(u_i^+ + u_{i+1}^-) \end{cases} \quad r_i = \dfrac{A_i - A_{i+1}}{A_i + A_{i+1}}$$

$$\begin{cases} \text{glottis: } u_1^+ = \dfrac{1 - r_g}{2} u_g - r_g u_1^- = \dfrac{1}{2} u_g - r_g\left(\dfrac{1}{2} u_g + u_1^-\right) & r_g \approx -1 \\ \text{lips: } u_{out} = (1 - r_N)u_N^+ = u_N^+ - u_N^- & r_N \approx -1 \end{cases}$$

The vocal tract is expressed by the cascading of a plurality of sound tubes with uniform sectional areas. In the above formulas, $A_i$ and $A_{i+1}$ are area functions of $i^{th}$ and $(i+1)^{th}$ sound tubes, $u_i^+$ and $u_i^-$ and are respectively sound pressures of left-going and right-going components in the $i^{th}$ sound tube, and $r_i$ is the reflection coefficient of adjacent junction of the $i^{th}$ sound tube and the $(i+1)^{th}$ sound tube.

As a preferred embodiment of the invention, the image analyzing and processing module comprises the following steps:

Step 1: initialize the parameters, that is, preset the scope of an analysis rectangular frame, the area threshold and the neutral network weight coefficient, then collect a frame of video image, wherein the area threshold is 1% of the area of the analysis rectangular frame;

Step 2: detect a lip area on the basis of a lip color detection method, that is, calculate the lip color feature value in the rectangular frame according to the following formula in the YUV color space and normalize the lip color feature value to the 0-255 gray level:

$$Z=0.493R-0.589G+0.026B$$

Step 3: calculate the optimal division threshold of a gray image of the lip color feature value by using an improved OTSU method, then use the threshold to divide the image in a binary way so as to obtain an initial division image of the lip;

Step 4: eliminate the area, whose area in the initial division image is smaller than the threshold, as the noise, by using the area threshold method to obtain the final lip division image;

Step 5: extract the outline and the center point of the lip area: set a major axis of an ellipsis and an X-axis in an angle of 0 degree, use the ellipsis model to match the outline of the lip, and detect the size of the major axis of the ellipsis and the size of a minor axis of the ellipsis by one-dimensional Hough transform;

Step 6: take the normalized semi-major axis, the normalized semi-minor axis, the ratio of the major axis to the minor axis, and the normalized lip area as a group of parameters, calculate the voice onset and offset times and the vowel classes, wherein the normalized semi-major axis, the normalized semi-minor axis and the normalized lip area are all normalized by the static semi-major axis, the semi-minor axis and the lip area in the non-sounding state.

As another preferred embodiment of the invention, an artificial neural network algorithm is used to calculate the voice onset and offset times and the vowel classes in the step 6 of the image analyzing and processing module.

As another preferred embodiment of the invention, the artificial neural network algorithm is a three-layer network comprising an input layer, a hidden layer and an output layer, wherein the input layer comprises four inputs, namely, the normalized semi-major axis, the normalized semi-minor axis, the ratio of the major axis to the minor axis, and the normalized lip area value; the output layer comprises six outputs, namely, non-sounding and five vowels of /a/, /i/, /e/, /ɔ/ and /u/.

As another preferred embodiment of the invention, the sound pressure waveform in lower pharyngeal region of vocal tract is taken as the voice source waveform applied for neck type electrolarynx in the voice source synthesis process.

As another preferred embodiment of the invention, the sound pressure waveform in the oral cavity is taken as the voice source waveform applied for oral type electrolarynx in the voice source synthesis process.

In order to fulfill the above purposes, the embodiments of invention further provides an electrolarynx system comprising a CMOS image sensor, an FPGA chip connected with the output end of the CMOS image sensor, a speech chip connected with the output end of the FPGA chip, and the electrolarynx vibrator connected with the output end of the speech chip.

The electrolaryngeal speech reconstruction method and the system thereof have the following advantages that: firstly, the glottal waveform is reflected by the amplitude parameter Ee and four time parameters of $t_p$, $t_e$, $t_a$ and $t_c$ in the LF model of the glottal voice source of the voice source synthesis module, and the five parameters can be extracted from the speech; therefore, for different users, the five parameters can be extracted from the speech retained before the loss of voice as synthesis parameters, so that the reconstructed speech has the individualized characteristics of the user. In addition, in the waveguide model of the vocal tract of the voice source synthesis module, the shape parameters of the vocal tract are selected according to the vowel classes judged by the video signals, the proper position for applying the vibrator is selected according to the surgery condition of the user, therefore, aiming at the applying position, the sound pressure waveform corresponding to the position of the vocal tract space is synthesized as the waveform of the voice source of an electrolarynx, in this way, the actual situation of the user is taken into consideration, the individualized features of the user can be greatly kept, the reconstructed speech is much closer to the original speech of the user himself, and the quality of the reconstructed speech is improved.

DETAILED DESCRIPTION OF THE EMBODIMENTS

Combined with the drawings, the electrolaryngeal speech reconstruction method and the system thereof of the invention are described in details.

Embodiments of the invention takes a computer system as a platform, regulates the synthesis of the waveform of a voice source according to the specific surgery condition of the user and the individualized sounding characteristics, uses the video signals to control the synthesis of the voice source in real time, and finally outputs the waveform of the voice source by an electrolarynx vibration output module connected in a parallel interface way.

The system of the electrolaryngeal speech reconstruction method of an embodiment of the invention comprises an image acquisition device, an image processing and analyzing module connected with the output end of the image acquisition device, a voice source synthesis module connected with the output end of the image processing and analyzing module, and an electrolarynx vibration output module connected with the output end of the voice source synthesis module.

Figure 1:
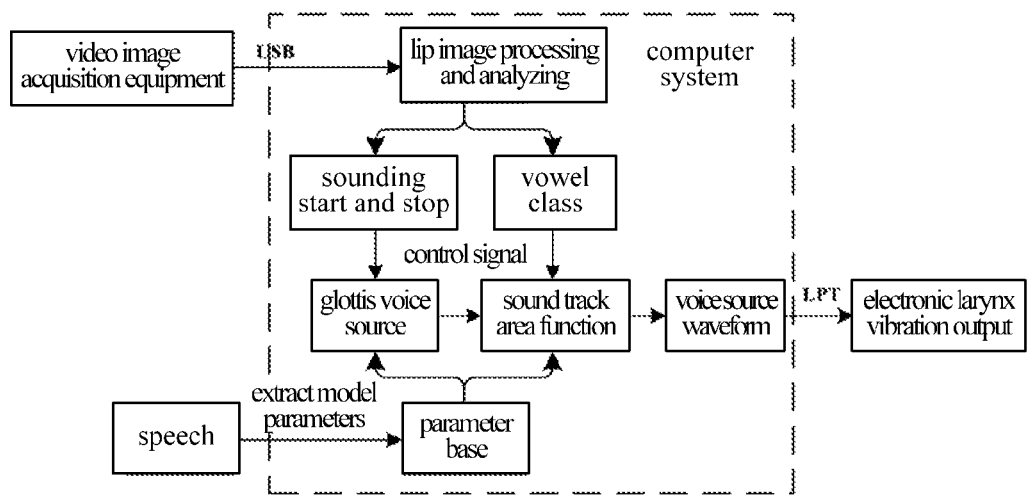
FIG. 1 is a flow diagram of an electrolaryngeal speech reconstruction method of an embodiment of the invention.

Please refer to the FIG. 1. When the system is started, the face images of the user during phonation are acquired by the image acquisition device that is a camera, and then transmitted to the image processing and analyzing module; after receiving the data, the image processing and analyzing module conducts processing and analyzing, namely, lip detection, lip division, edge extraction and fitting, so as to obtain the shape parameters of an ellipsis model of the edge of the lip, then the voice onset and offset times and the vowel classes are judged by an artificial neural network algorithm and are used as control signals for the synthesis of the voice source; the voice source synthesis module uses the principle of the articulatory synthesis and synthesizes the waveform of the voice source having the individualized features of the user and corresponding to actual sounding requirements according to the different situations of the user, including the surgery condition, individualized sounding characteristics as well as the extracted voice onset and offset times and the vowel classes; finally, the synthesized voice source waveform is output by the electrolarynx vibration output module.

From the above description, the electrolaryngeal speech reconstruction method of the invention mainly comprises three parts, namely, I. image acquisition and processing, II. synthesis of the voice source of the electrolarynx, and III. the vibration output of the electrolarynx. Detailed description is as follows:

The first part of the invention is the image acquisition and processing which mainly uses the image processing method to analyze the movement of the lip in real time, uses the artificial neural network to judge the voice onset and offset times and the vowel classes, and uses the voice onset and offset times and the vowel classes as control signals to control the dynamic synthesis of the voice source of the electrolarynx.

Figure 2:
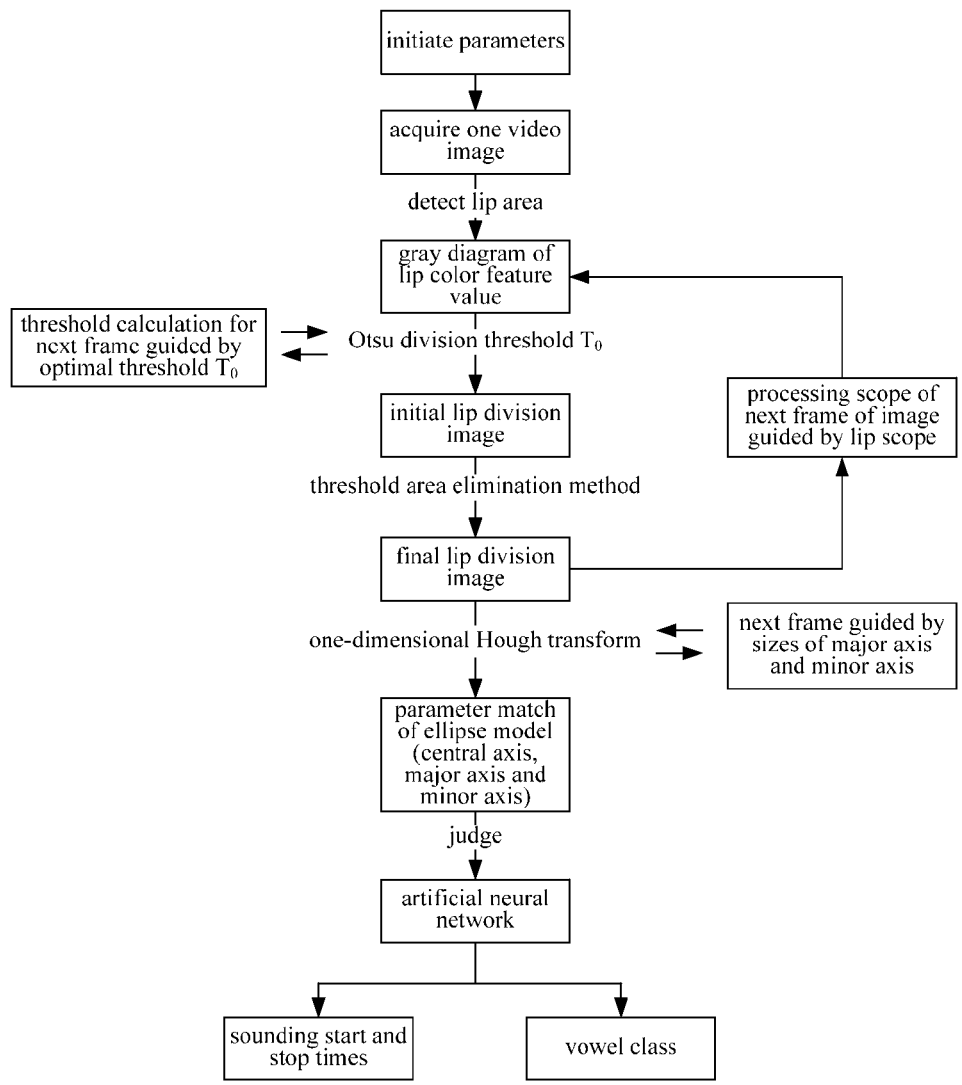
FIG. 2 is a program flow diagram for the extraction of processing and controlling parameters of a lip movement image of an embodiment of the invention.

Combined with the FIG. 2, the specific steps for the implementation of the first part are described as follows:

1) initialize the parameters, that is, preset the scope of an analysis rectangular frame, the area threshold and the neutral network weight coefficient, then collect a frame of video image, wherein the area threshold is 1% of the area of the analysis rectangular frame;

2) detect a lip area on the basis of a lip color detection method, that is, calculate the lip color feature value in the rectangular frame according to the following formula 1 in the YUV color space and normalize the lip color feature value to 0-255 gray level, so as to obtain a gray image of the lip color feature value; the formula 1 is as follows:

$$Z = 0.493R - 0.589G + 0.026B \quad \text{Formula 1}$$

In the Formula 1, R, G and B represent red component, green component and blue component repectively.

3) calculate the optimal division threshold of the gray image of the lip color feature value by using an improved OTSU method, then use the threshold to divide the image in a binary way so as to an initial division image of the lip;

4) eliminate the district, whose area in the initial division image is smaller than the threshold, as the noise, by using the area threshold method to obtain the final lip division image;

5) extract the outline and the center point of the lip area: assume that a major axis of an ellipsis and an X-axis are in an angle of 0 degree, use the ellipsis model to match the outline of the lip, and detect the size of the major axis of the ellipsis and the size of a minor axis of the ellipsis by one-dimensional Hough transform;

6) take the normalized semi-major axis, the normalized semi-minor axis, the ratio of the major axis to the minor axis and the normalized lip area as a group of parameters, and calculate the voice onset and offset times and the vowel classes by the artificial neural network, so as to control the synthesis of the voice source.

Notes: in the invention, the normalized semi-major axis, the normalized semi-minor axis and the normalized lip area are all normalized by the static semi-major axis, the semi-minor axis and the lip area in the non-sounding state.

In this embodiment, as the inputs of the neural network, the ratio of the major axis to the minor axis and the normalized parameters not only can reflect the change of the lip shape accurately, but also can judge the voice onset and offset times and the vowel classes, so that good distance invariance property is realized, the judge error resulting from the change of the area of the lip in the image due to the change of the distance between the user and the camera can be overcome, therefore, the obtained judge signal and the speech waveform have excellent goodness of fit, and the judge accuracy is higher.

In addition, in order to meet the real-time requirement, in the image processing of the invention, a time-space domain joint tracking control method is adopted in both the lip division and the parameter matching of the ellipsis model, that is, on the basis of the assumption that the face changes slowly and continuously in the course of speaking, the divided rectangle scope of the image and the matched parameter scope are guided by the divided area information of the previous image and the matched parameter information of the ellipsis, the frame information and the inter-frame information are better utilized, therefore, the processing speed is increased, and the calculation accuracy is increased.

The artificial neural network of the invention is a three-layer forward neural network comprising an input layer (namely, the normalized semi-major axis, the normalized semi-minor axis, the ratio of major axis to the minor axis, and the normalized lip area value), a hidden layer (30 nodes) and an output layer (namely, non-sounding and five vowels of /α/, /i/, /e/, /ɔ/ and /u/, wherein the node weight coefficient of the neural network is obtained in advance by training, the training adopts an error backward propagation (BP) algorithm, the samples are the shape parameters of the lip when in the non-sounding static state and in the state of producing the sounds of the vowels.

Figure 3:
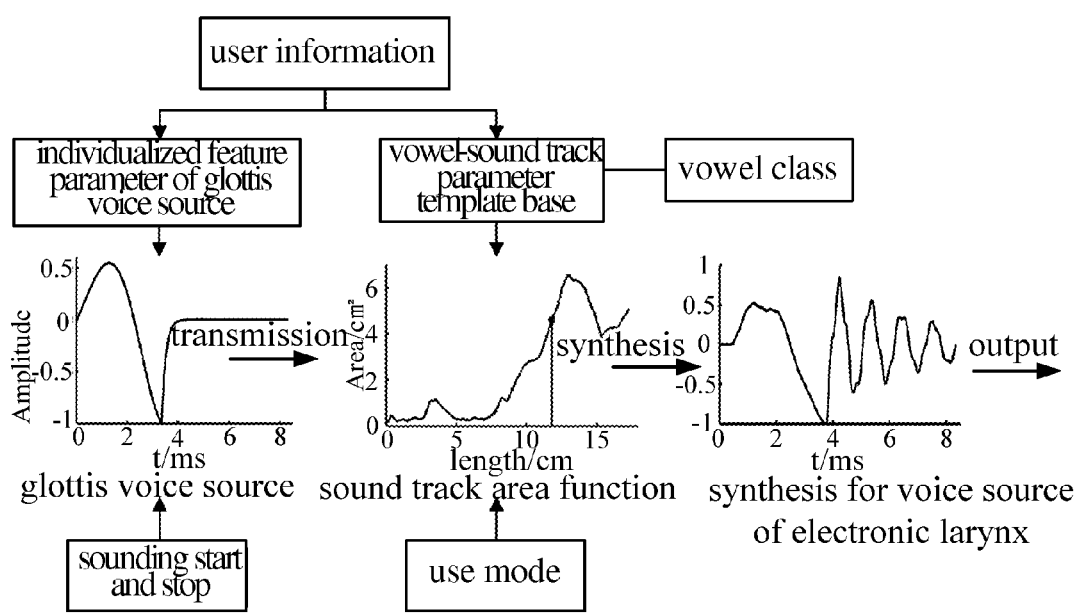
FIG. 3 is a flow diagram for the synthesis of a voice source of an embodiment of the invention.

Please continue to refer to the FIG. 3. The second part of the invention is the synthesis of the voice source. By using the principle of the articulatory synthesis, the voice source of the electrolarynx is synthesized based on source-filter theory by two steps. The specific steps are as follows:

Step 1: synthesize the waveform of a glottal voice source: according to the individualized sounding features of the user, the parameters of the glottal voice source model are selected and set from a parameter library, the voice onset and offset times acquired in the image analyzing and processing module are used for controlling the starting and the stopping of the synthesis of the voice source, and the glottal voice source is synthesized according to an LF model;

The synthesis of the glottal voice source adopts the LF model, and the specific math expressions are as follows:

$$\begin{cases} u'_g(t) = E_0 e^{\alpha t} \sin(\omega_g t) & (0 \leq t \leq t_e) \\ u'_g(t) = -\left(\frac{E_e}{\varepsilon t_a}\right)[e^{-\varepsilon(t-t_e)} - e^{-\varepsilon(t_c-t_e)}] & (t_e \leq t \leq t_c) \end{cases}$$

In the above expressions, Ee is the amplitude parameter, $t_p$, $t_e$, $t_a$ and $t_e$ are all time parameters which respectively represent the maximum peak time, the maximum negative peak time, the time constant of exponential return phase and the pitch period, and the rest parameters can be obtained by the above five parameters with reference to the following formulas:

$$\begin{cases} \varepsilon t_a = 1 - e^{-\varepsilon(t_c - t_e)} \\ \omega_g = \dfrac{\pi}{t_p} \\ U_e = E_0[e^{\alpha t_e}(\alpha \sin\omega_g t_e - \omega_g \cos\omega_g t_e) + \omega_g]/(\alpha^2 + \omega_g^2) \\ E_e = -E_0 e^{\alpha t_e} \sin\omega_g t_e \\ U_e = \dfrac{E_e t_a}{2} K_\alpha \\ K_\alpha = \begin{cases} 2.0 & R_\alpha < 0.1 \\ 2 - 2.34 R_\alpha^2 + 1.34 R_\alpha^4 & 0.1 \le R_\alpha \le 0.5 \\ 2.16 - 1.32 R_\alpha + 0.64(R_\alpha - 0.5)^2 & R_\alpha > 0.5 \end{cases} \\ R_\alpha = \dfrac{t_a}{t_c - t_e} \end{cases}$$

Step 2: select the shape parameters of a vocal tract according to the vowel classes, simulate the sound transmission in the vocal tract by using a waveguide model, and calculate the sound pressure waveform at the position where the vibration is transmitted in the vocal tract during the practical use of a user according to the following formulas, so as to obtain the synthesized voice source of the electrolarynx.

The specific math expressions for the waveguide model simulating sound transmission in the vocal tract are as follows:

$$\begin{cases} u_{i+1}^+ = (1 - r_i) u_i^+ - r_i u_{i+1}^- = u_i^+ - r_i(u_i^+ + u_{i+1}^-) \\ u_i^- = (1 + r_i) u_{i+1}^- + r_i u_i^+ = u_{i+1}^- + r_i(u_i^+ + u_{i+1}^-) \end{cases} \quad r_i = \dfrac{A_i - A_{i+1}}{A_i + A_{i+1}}$$

$$\begin{cases} \text{glottis: } u_1^+ = \dfrac{1 - r_g}{2} u_g - r_g u_1^- = \dfrac{1}{2} u_g - r_g\left(\dfrac{1}{2} u_g + u_1^-\right) & r_g \approx -1 \\ \text{lips: } u_{out} = (1 - r_N) u_N^+ = u_N^+ - u_N^- & r_N \approx -1 \end{cases}$$

The vocal tract is expressed by the cascading of a plurality of sound tubes with uniform sectional areas. In the above formulas, $A_i$ and $A_{i+1}$ are area functions of ith and $(i+1)^{th}$ sound tubes, $u_i^+$ and $u_i^-$ and are respectively sound pressure of left-going and right-going components in the $i^{th}$ sound tube, $r_i$ is the reflection coefficient of adjacent junction of the $i^{th}$ sound tube and the $(i+1)^{th}$ sound tube and is determined by the sectional areas $A_i$ and $A_{i+1}$ of the adjacent sound tubes, and the waveguide model can calculate the sound pressure at any position of the vocal tract by iteration.

It is important to note that: firstly, in the LF model of the voice source synthesis module, the waveform of the glottal voice source is determined by the amplitude parameter Ee and the four time parameters of $t_p$, $t_e$, $t_a$ and $t_c$. For different persons, the waveforms of the glottal voice sources have individual differences due to the different anatomical structures and different sounding characteristics, while the individual differences can be reflected in the five parameters of the LF model, and the five parameters can be extracted from the speech. For example, the pitch of a woman is usually higher than that of a man during phonation; therefore, tc of the woman is less than that of the men, and the like. In the invention, in order to fully keep the sound characteristics of the user to reconstruct the speech identical with that of the user before the loss of voice, the above five parameters need to be extracted from the speech of the user collected before the loss of voice and are stored in the parameter library; when the electrolarynx is used, the speech having the sounding characteristics of the user can be reconstructed only by extracting the parameters from the parameter library, however, for the patient whose speech is not collected before the loss of voice, the substitution parameters with the speech characteristics that the patient like can be selected so as to reconstruct the favorite speech of his own.

Secondly, in the waveguide model of the voice source synthesis module, the only one parameter is the area function Ai of the vocal tract, as different persons or different vowels, the corresponding shapes of the vocal tracts differ, therefore, the control method adopting the vowel classes in the invention can select different vocal tract area functions for synthesis according to different vowels; for different users, we firstly establish a template library with the vowels corresponding to the vocal tract area functions, so that the corresponding vocal tract functions can be searched during the synthesis according to the judgment of the vowel classes; the template library is established in a way that a vocal tract response function is acquired from the recorded speech of the user by inverse filter, then an optimally matched vocal tract area function is obtained from the vocal tract response function, so that the individualized sounding features of the user can be kept.

From the above, we can see that a sound pressure signal at any position in the vocal tract can be calculated by the two steps of synthesis, however, the selection for the sound pressure signal at which position in the vocal tract as the voice source of the electrolarynx is determined by the specific surgery condition and electrolarynx type of the user.

Figure 4:
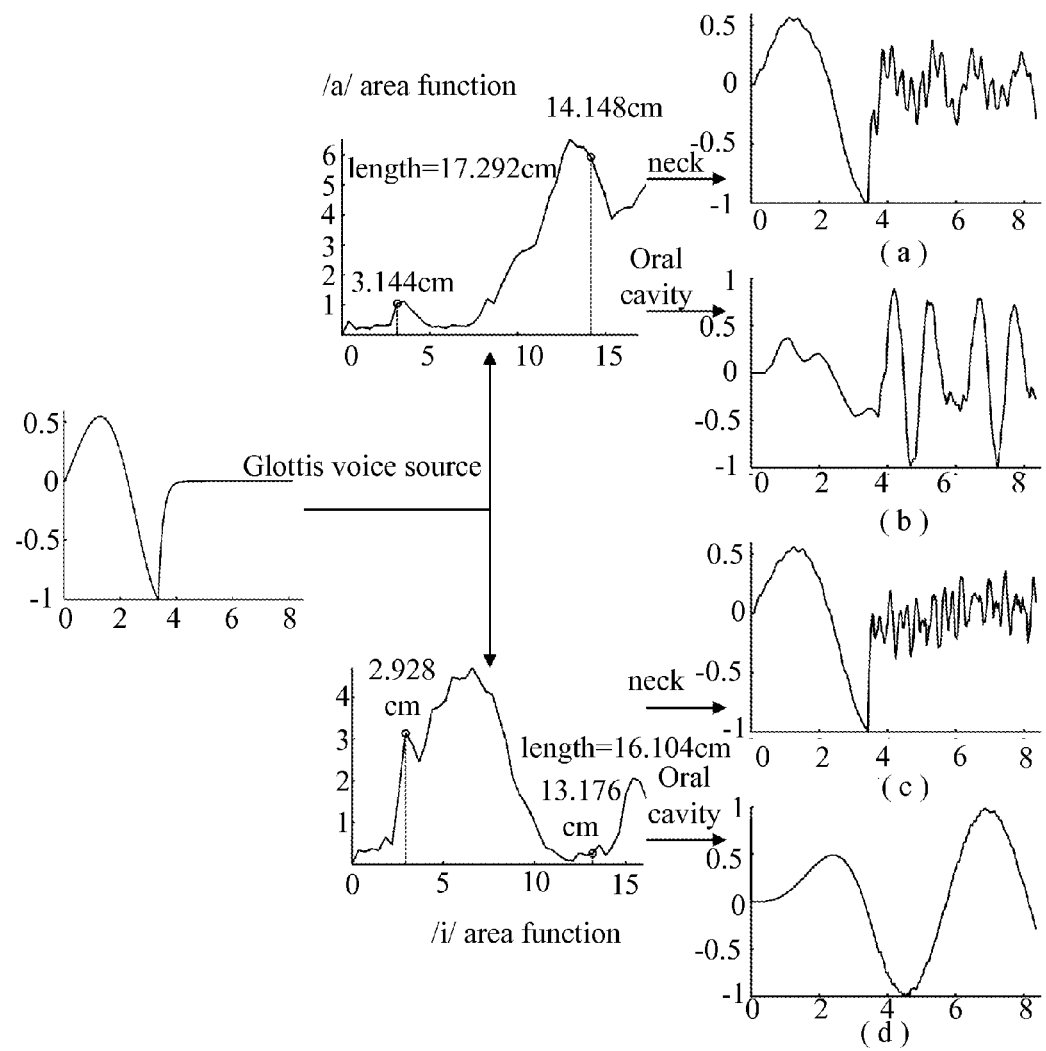
FIG. 4 is a waveform diagram of the voice source of an electrolarynx synthesized in different vowel and using situations of an embodiment of the invention.

FIG. 4 below shows waveform diagrams of the voice source synthesized in different situations. For example, for the user suffering from laryngectomy due to the laryngeal cancer but keeping the vocal tract intact, a method of applying vibration on the neck can be used so as to fully utilize the functions of the retained vocal tract, therefore, the sound pressure waveform at lower pharyngeal resion of vocal tract is selected as the waveform of the voice source of the electrolarynx, and FIG. 4(a) and FIG. 4(c) are the waveforms of the synthesized voice source when the vowels /α/ and /i/ are produced in the above situation. For the patient with the pharyngeal cancer, the pharyngectomy is required, in this way, the vocal cord of the patient is lost, and most of the vocal tract is damaged, then the sound pressure waveform at the oral cavity is selected as the waveform of the voice source, and FIG. 4 (b) and FIG. 4 (d) are respectively waveforms of the synthesized voice source when the vowels /α/ and /i/ are produced in the above situation.

In this way, from the FIG. 4, we can see that in the invention, different waveforms of the voice source of the electrolarynx are synthesized aiming at different surgery condition, different use situations and different vowel classes, thereby not only meeting the requirement of practical application, but also keeping the individualized characteristics of the user and improving the quality of the reconstructed speech of the electrolarynx to a great extent.

Figure 5:
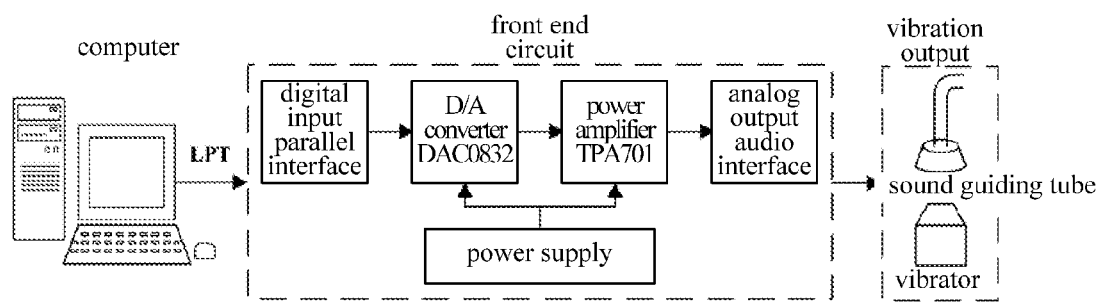
FIG. 5 is a schematic diagram of a vibration output module of the electrolarynx of an embodiment of the invention.

Please refer to the FIG. 5. The third module of the invention is the electrolarynx vibration output module comprising an electrolarynx vibrator and a driving circuit of the electrolarynx vibrator, a computer inputs the synthesized waveform signals of the voice source of the electrolarynx to the driving circuit by an LPT parallel interface, after digital-to-analogue conversion and power amplification are carried out on the waveform signals, a analog voltage signal is output by an audio interface, finally, the electrolarynx vibrator vibrates so as to output the voice source.

The electrolarynx vibrator is a linear transducer which can converts the voltage signal into mechanical vibration linearly, therefore, the vibration can be output according to the synthesized voice source, and meanwhile, the vibration is guided into the oral cavity by a sound tube so as to meet the requirement of application in the oral cavity.

Please continue to refer to the FIG. 5. The driving circuit of the electrolarynx vibrator consists of an input interface, an output interface, a D/A converter, a power amplifier and a power controller, wherein the input and output interfaces are respectively a parallel interface with 25 DB digital input and a audio interface with 3.5 mm analog output, the digital input parallel interface is connected with a parallel interface output end of the computer, the transmission speed is 44100 Byte/s, the analog output audio interface is connected with the electrolarynx vibrator, the D/A digital-to-analogue converter adopts a DAC0832 type with 8-bit data accuracy and can be directly connected with data bits of the LPT parallel interface; the power amplifier uses a TPA701 audio power amplifier of the TI company, the power supply of +3.5-+5.5V is supplied, and the output power can reach 700 mW; the power controller is a 5V battery and can supply +5V direct-current voltage to chips.

Figure 6:
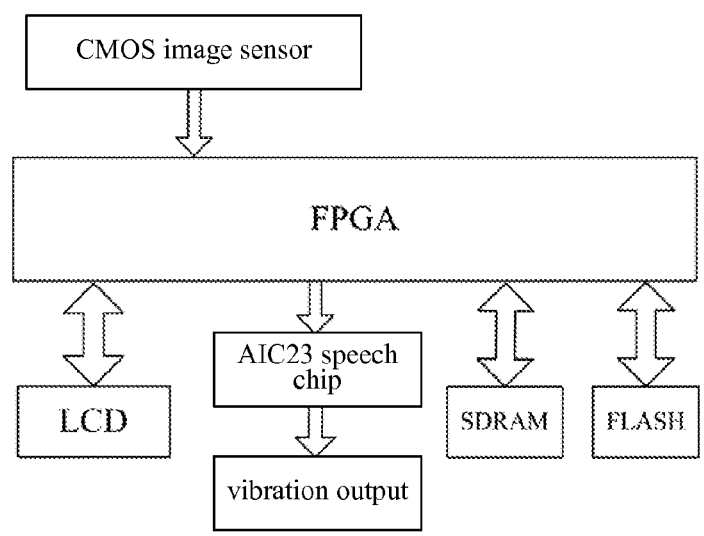
FIG. 6 is a structural diagram of the electrolaryngeal speech system of an embodiment of the invention.

In the above embodiment, a electrolaryngeal speech system is implemented on the basis of video acquisition equipment, the computer and the electrolarynx vibration output module; however, in order to be convenient for the implementation, another embodiment can also be used, as shown in the FIG. 6, the electrolaryngeal speech system in the embodiment comprises a CMOS image sensor for acquiring images, an FPGA chip connected with the output end of the CMOS image sensor and used for analyzing and processing the acquired images and synthesizing the voice source, a speech chip connected with the output end of the FPGA chip and used for performing D/A conversion and power amplification for the waveform of the synthesized voice source of the electrolarynx, and an electrolarynx vibrator connected with the output end of the speech chip.

The CMOS image sensor adopts a MT9M011 type of the MICRON Company and has the maximum resolution ratio of 640×480 and the frame rate of 60 frame/s at the resolution ratio. The CMOS image sensor is used for acquiring the face images of the user during phonation.

The FPGA chip supports the SOPC technology, takes the video data as input, and finally outputs the waveform data of the voice source of the electrolarynx by the processing and analyzing for the video data and the synthesis of the voice source of the electrolarynx. Besides an interface connected with the CMOS image senor and the speech chip, the FPGA chip further comprises an LCD, a FLASH and an SDRAM, wherein the LCD is a liquid crystal display used for displaying the related data, the FLASH is a flash memory, and the SDRAM is a synchronous dynamic random access memory.

The speech chip adopts an AIC23 type, comprises a D/A converter and has power amplification function; and the audio interface outputs to the electrolarynx vibrator after the D/A conversion and the power amplification.

What is said above is only one embodiment of the invention, but not all embodiments or the unique embodiment. Any equivalent transform of the technical scheme of the invention by the common technical personnel in the field by reading the description of the invention is contained completely in the claims of the invention.

What is claimed is:

1. An electronic larynx speech reconstruction method, comprising the following steps:
model parameters are extracted from a collected speech as a parameter base;
face images of a sounder are acquired and transmitted to an image analyzing and processing module, sounding start and stop times and vowel classes are obtained after the image analyzing and processing model analyzes and processes the images;

sounding start and stop times and the vowel classes are used to control a voice source synthesis module to synthesize a waveform of a voice source;

the waveform of the voice source is output by an electronic larynx vibration output module, wherein the electronic larynx vibration output module comprises a front end circuit and an electronic larynx vibrator; and wherein the synthesis steps of the voice source synthesis module are as follows:

1) synthesize the waveform of a glottis voice source, which comprises select the model parameters of the glottis voice source from the parameter base according to the individualized sounding features of the sounder, wherein the sounding start and stop times control the starting and the stopping of the synthesis of the voice source, and the synthesis of the glottis voice source adopts a Liljencrants-Fant model with the math formulas as follows:

$$\begin{cases} u'_g(t) = E_0 e^{\alpha t} \sin(\omega_g t) & (0 \le t \le t_e) \\ u'_g(t) = -\left(\dfrac{E_e}{\varepsilon t_a}\right)[e^{-\varepsilon(t-t_e)} - e^{-\varepsilon(t_c-t_e)}] & (t_e \le t \le t_c) \end{cases}$$

in the formulas, Ee is the amplitude parameter, $t_p$, $t_e$, $t_a$ and $t_c$ are all time parameters which respectively represent the maximum peak time, the maximum negative peak time, the exponential restore segment time constant and the base frequency period of airflow, $E_0$ is the amplitude parameter, $U_g$ is airflow value at the $t_e$ time, $\alpha$ is the exponential equation coefficient of open phase, $\epsilon$ is the exponential equation coefficient of return phase, $\omega_g$ is angular frequency of opening phase, and rest parameters are obtained by the above five parameters with reference to the following formulas:

$$\begin{cases} \varepsilon t_a = 1 - e^{-\varepsilon(t_c - t_e)} \\ \omega_g = \dfrac{\pi}{t_p} \\ U_e = E_0[e^{\alpha t_e}(\alpha \sin \omega_g t_e - \omega_g \cos \omega_g t_e) + \omega_g]/(\alpha^2 + \omega_g^2) \\ E_e = -E_0 e^{\alpha t_e} \sin \omega_g t_e \\ U_e = \dfrac{E_e t_a}{2} K_a \\ K_a = \begin{cases} 2.0 & R_a < 0.1 \\ 2 - 2.34 R_a^2 + 1.34 R_a^4 & 0.1 \le R_a \le 0.5 \\ 2.16 - 1.32 R_a + 0.64(R_a - 0.5)^2 & R_a > 0.5 \end{cases} \\ R_a = \dfrac{t_a}{t_c - t_e} \end{cases}$$

2) select shape parameters of a sound track according to the vowel classes, simulate sound transmission in the sound track by using a waveguide model, and calculate the waveform of the voice source according the following formulas:

$$\begin{cases} u_{i+1}^+ = (1-r_i)u_i^+ - r_i u_{i+1}^- = u_i^+ - r_i(u_i^+ + u_{i+1}^-) \\ u_i^- = (1+r_i)u_{i+1}^- + r_i u_i^+ = u_{i+1}^- + r_i(u_i^+ + u_{i+1}^-) \end{cases} \quad r_i = \dfrac{A_i - A_{i+1}}{A_i + A_{i+1}}$$

-continued $$\begin{cases} \text{glottis: } u_1^+ = \frac{1-r_g}{2}u_g - r_g u_1^- = \frac{1}{2}u_g - r_g\left(\frac{1}{2}u_g + u_1^-\right) & r_g \approx -1 \\ \text{lips: } u_{out} = (1-r_N)u_N^+ = u_N^+ - u_N^- & r_N \approx -1 \end{cases}$$

wherein the sound track is expressed by the cascading of a plurality of sound tubes with uniform sectional areas; in the above formulas, $A_i$ and $A_{i+1}$ are area functions of $i^{th}$ and $(i+1)^{th}$ sound tubes, $u_i^+$ and $u_i^-$ are respectively forward sound pressure and reverse sound pressure in the $i^{th}$ sound tube, $r_i$ is the reflection coefficient of adjacent interfaces of the $i^{th}$ sound tube and the $(i+1)^{th}$ sound tube, $u_g$ is the waveform of the glottal voice source obtained through the calculation of the Liljencrants-Fant model, $u_N$ is the sound pressure value of lip end, N is the number of segments of tubes with different areas, wherein the vocal tract is expressed by N segments of connected tubes, and $u_{out}$ is the waveform of the speech of the lip end.

2. The electronic larynx speech reconstruction method according to claim 1, wherein the image processing and analyzing module comprises the following steps:
step 1: initialize the parameters, which comprises preset the scope of an analysis rectangular frame, an area threshold and a neutral network weight coefficient, and collect a frame of video image, wherein the area threshold is 1% of the area of the analysis rectangular frame;
step 2: detect a lip area on the basis of a complexion detection method, which comprises calculate the lip color feature value in the scope of the rectangular frame according the following formula in a YUV color space and normalize the lip color feature value to the 0-255 gray level:

$Z=0.493R-0.589G+0.026B$ step 3: calculate the optimal division threshold of a gray image of the lip color feature value by using an improved method of maximum inter-class variance, and use the threshold to divide the image in a binary way so as to obtain an initial division image of the lip;
step 4: eliminate district, whose area in the initial division image is smaller than the threshold, as the noise, by using an area threshold method to obtain the final lip division image;
step 5: extract outline and center point of the lip area: set a major axis of an ellipsis and an X-axis in an angle of 0 degree, use the ellipsis model to match the outline of the lip, and detect the size of the major axis of the ellipsis and the size of a minor axis of the ellipsis by one-dimensional Hough transform;
step 6: take the normalized half major axis, the normalized half minor axis, the ratio of the major axis to the minor axis, and the normalized lip area as a group of parameters, calculate the sounding start and stop times and the vowel classes, wherein the normalized half major axis, the normalized half minor axis and the normalized lip area all refer to normalized values taking the static half major axis, the half minor axis and the lip area in the non-soundingstate as the standards.

3. The electronic larynx speech reconstruction method according to claim 2, wherein an artificial neural network algorithm is adopted to calculate the sounding start and stop times and the vowel classes in the step 6 of the image analyzing and processing module.

4. The electronic larynx speech reconstruction method according to claim 3, wherein the artificial neural network algorithm is a three-layer network comprising an input layer, a hidden layer and an output layer, wherein the input layer comprises four inputs, which are the normalized half major axis, the normalized half minor axis, the ratio of the major axis to the minor axis, and the normalized lip area value, and the output layer comprises six outputs, which are non-sounding and five vowels of /ɑ/, /i/, /e/, /ɔ/ and /u/.

5. The electronic larynx reconstruction method according to claim 1, wherein the sound pressure waveform at the lower part of a sound track pharynx is taken as the waveform of the voice source applied on a neck in the synthesis process of the voice source.

6. The electronic larynx reconstruction method according to claim 4, wherein the sound pressure waveform at the lower part of a sound track pharynx is taken as the waveform of the voice source applied on a neck in the synthesis process of the voice source.

7. The electronic larynx reconstruction method according to claim 1, wherein the sound pressure waveform of the position of the oral cavity is taken as the waveform of the voice source applied in the oral cavity in the synthesis process of the voice source.

8. The electronic larynx reconstruction method according to claim 4, wherein the sound pressure waveform of the position of the oral cavity is taken as the waveform of the voice source applied in the oral cavity in the synthesis process of the voice source.

9. An electronic larynx speech system with the application of the method according to claim 1, wherein the system comprises a CMOS image sensor, a field programmable gata array chip connected with the output end of the CMOS image sensor, a speech chip connected with the output end of the field programmable gata array chip, and the electronic larynx vibrator connected with the output end of the speech chip.

* * * * *